United States Patent
Hachiken et al.

(10) Patent No.: US 11,495,063 B2
(45) Date of Patent: Nov. 8, 2022

(54) AUTOMATED-DRIVING DEVICE USED IN VEHICLE TESTING

(71) Applicant: HORIBA, LTD., Kyoto (JP)

(72) Inventors: Takuma Hachiken, Kyoto (JP);
Yoshiaki Matsubara, Kyoto (JP);
Kazuki Furukawa, Kyoto (JP);
Susumu Togawa, Kyoto (JP);
Kazunori Kuriaki, Kyoto (JP);
Yasutaka Kawakita, Kyoto (JP);
Kosuke Ol, Kyoto (JP)

(73) Assignee: HORIBA, LTD., Kyoto (JP)

( * ) Notice: Subject to any disclaimer, the term of this patent is extended or adjusted under 35 U.S.C. 154(b) by 290 days.

(21) Appl. No.: 16/872,290

(22) Filed: May 11, 2020

(65) Prior Publication Data

US 2020/0364956 A1 Nov. 19, 2020

(30) Foreign Application Priority Data

May 14, 2019 (JP) .............................. JP2019-091716

(51) Int. Cl.
*G01M 17/00* (2006.01)
*G07C 5/08* (2006.01)
*B25J 13/08* (2006.01)

(52) U.S. Cl.
CPC ............ *G07C 5/0808* (2013.01); *B25J 13/08* (2013.01); *G01M 17/00* (2013.01)

(58) Field of Classification Search
CPC .................................................... G01M 17/00
See application file for complete search history.

(56) References Cited

U.S. PATENT DOCUMENTS

| | | | | | |
|---|---|---|---|---|---|
| 5,270,628 | A | * | 12/1993 | Noguchi ................ | G09B 9/04 477/121 |
| 5,363,027 | A | * | 11/1994 | Noguchi ................ | G09B 9/04 73/115.04 |
| 5,372,035 | A | * | 12/1994 | Ogawa .............. | G01M 17/0074 73/115.03 |
| 5,394,743 | A | * | 3/1995 | Noguchi ............... | G01M 13/02 73/115.03 |

(Continued)

FOREIGN PATENT DOCUMENTS

| | | |
|---|---|---|
| EP | 2667173 A2 | 11/2013 |
| JP | 05-092803 U | 12/1993 |

(Continued)

OTHER PUBLICATIONS

EESR dated Oct. 15, 2020 issued for European Patent Application No. 20174437.2, 7 pgs.

(Continued)

*Primary Examiner* — Eric S. McCall
(74) *Attorney, Agent, or Firm* — Brooks Kushman, P.C.

(57) ABSTRACT

An automated-driving device causes a test body which is either a vehicle or part of a vehicle to perform automated-driving using a plurality of types of actuators. This automated-driving device includes a plurality of connectors to which the actuators are connected, and a control device that controls movements of the actuators that are connected to the connectors. When one of the actuators is connected to one of the connectors, the control device identifies the type of actuator that is connected.

6 Claims, 4 Drawing Sheets

(56) References Cited

U.S. PATENT DOCUMENTS

| | | | | |
|---|---|---|---|---|
| 5,415,034 A | * | 5/1995 | Nishikawa | G01M 17/0074 |
| | | | | 73/115.03 |
| 2015/0338313 A1 | * | 11/2015 | Tanaka | G01M 17/0072 |
| | | | | 701/32.8 |
| 2016/0377508 A1 | | 12/2016 | Perrone et al. | |
| 2020/0189483 A1 | * | 6/2020 | Matsubara | B60R 11/02 |

FOREIGN PATENT DOCUMENTS

| | | |
|---|---|---|
| JP | 2003-149087 A | 5/2003 |
| JP | 2003-149088 A | 5/2003 |
| JP | 2005003591 A | 1/2005 |
| JP | 2010-175297 A | 8/2010 |

OTHER PUBLICATIONS

Office Action dated Nov. 30, 2021 issued in JP patent application No. 2019-091716, 6 pgs.
Notice of Allowance for Japanese Application No. 2019-091716, dated Aug. 30, 2022, 5 Pages.

* cited by examiner

| IDENTIFIER | TYPE OF GENERAL-PURPOSE ACTUATOR |
|---|---|
| 1 | FOR A PUSH STARTER |
| 2 | FOR A TURN STARTER |
| 3 | FOR A BUTTON SHIFT (P SWITCH) |
| 4 | FOR A BUTTON SHIFT (N SWITCH) |
| 5 | FOR A BUTTON SHIFT (D SWITCH) |
| 6 | FOR A BUTTON SHIFT (SHIFT UP) |
| 7 | FOR A PADDLE SHIFT (SHIFT DOWN) |
| 8 | FOR AN AIR-CONDITIONER (TURN ON) |
| 9 | FOR AN AIR-CONDITIONER (TURN OFF) |

Fig.4

AUTOMATED-DRIVING DEVICE USED IN VEHICLE TESTING

CROSS-REFERENCE TO RELATED APPLICATION

This application claims priority to Japanese Application No. 2019-091716, filed May 14, 2019, the disclosure of which is incorporated in its entirety by reference herein.

TECHNICAL FIELD

The present invention relates to an automated-driving device that enables a test body which is either a vehicle or part of a vehicle to perform automated-driving.

TECHNICAL BACKGROUND

When a performance test is carried out on a vehicle using a chassis dynamometer, it is common for an automated-driving device such as an automated-driving robot or the like to be installed in the driver's seat, and for this automated-driving device to perform a driving operation of the vehicle (Patent Document 1). In this type of automated-driving device, a pedal operation actuator that performs pedal operations and a shift operation actuator that performs shift operations are connected to a control device that is installed in the driver's seat, and the vehicle is made to perform an automated-driving operation as a result of the control device operating these actuators.

DOCUMENTS OF THE PRIOR ART

Patent Documents

Patent Document
1 Japanese Unexamined Patent Application (JP-A) No. 2003-149087

DISCLOSURE OF THE INVENTION

Problems to be Solved by the Invention

In recent years, when vehicles in which the above-described automated-driving device is used are automated-driving, it is common for various types of actuators to be used not only for performing pedal operations and shift operations, but also for operating various types of switches such as a starter switch and air-conditioner switches and the like. In a conventional automated-driving device, each actuator performing the various types of operation is matched one-to-one to respective connectors that are provided in the control device to which the actuators are connected. Consequently, it is necessary, for example, for an actuator that is used to operate a starter switch to be correctly connected to the connector for starter switch operations which is provided in the control device. Because of this, when an operator is working in a narrow space and connecting the actuators by feeling their way by hand, it is not uncommon for incorrect connections to be made. If, on the other hand, an operator slowly and carefully performs the connection task so as not to make any incorrect connections, then the actuator connection operation takes an inordinate length of time, so that work efficiency is reduced.

It is a principal object of the present invention to provide an automated-driving device that, in a control device in which multiple types of actuators are connected, enables incorrect connections to be prevented, and enables work efficiency to be improved.

Means for Solving the Problem

Namely, an automated-driving device according to the present invention is an automated-driving device that causes a test body which is either a vehicle or part of a vehicle to perform automated-driving using a plurality of types of actuators, and that includes a plurality of connectors to which the actuators are connected, and a control device that controls movements of the actuators that are connected to the connectors, wherein, when one of the actuators is connected to one of the connectors, the control device identifies the type of actuator that is connected.

If the above-described type of structure is employed, when an actuator is connected to any one of a plurality of connectors, the type of actuator that is connected is identified. As a result, the actuator can be made to function regardless of which connector it is connected to. In other words, it is not necessary for a particular actuator to be matched one-to-one to a particular connector, and a plurality of connectors are able to be connected to a plurality of types of actuators. As a result, it is possible to prevent incorrect connections that result from an actuator being connected to an incorrect connector. Moreover, because an operator is able to connect an actuator to any one of a plurality of connectors, the connection task is simplified, and work efficiency is improved.

A specific aspect of the above-described automated-driving device is an automated-driving device in which each of the plurality of types of actuators has an identifier that corresponds to the type of actuator, and the control device is provided with a storage unit that stores identification information which associates the identifier with the type of actuator, and an identification unit that reads the identifier of the actuator connected to the connector and, by referring to the relevant identifier and the identification information, identifies the type of actuator that is connected.

One aspect that clearly demonstrates the effects of the above-described present invention is an automated-driving device in which each of the plurality of connectors has the same shape.

It is also preferable for the storage unit to store identification information for at least one of a starter operation, a button-type shift operation, a paddle-type shift operation, and an air-conditioner operation, and more preferable for the storage unit to store identification information for two or more of these operations.

It is also preferable that, when the automated-driving device has been installed on the driver's seat of the test body, the plurality of connectors be positioned at a front surface of the control device.

If this type of structure is employed, then because a plurality of connectors are disposed at a front surface of the control device installed in the driver's seat, compared with when connectors are provided at a back surface of the control device, an operator is able to connect the actuators easily so that the work efficiency is improved even further.

Moreover, a vehicle testing system of the present invention is characterized in being provided with the above-described automated-driving device, a dynamometer that applies a load to the test body that is being driven by the automated-driving device, and an exhaust gas analysis device that analyzes exhaust gas discharged from the test body.

Furthermore, an actuator identification method of the present invention is a method in which, in an automated-driving device that comprises a plurality of connectors to which a plurality of types of actuators are connected, and that causes a test body which is either a vehicle or part of a vehicle to perform automated-driving using the actuators that are connected to the connectors, the types of actuators that are connected to the connectors are identified, wherein the types of actuators that are connected are identified as a result of the actuators being connected to any one of the plurality of connectors.

According to the vehicle testing system and actuator identification method of the present invention, the same type of action and effects as those obtained from the above-described automated-driving device of the present invention can be achieved.

Effects of the Invention

According to the present invention which has the above-described structure, in an automated-driving device in which a plurality of types of actuators are connected, it is possible to prevent the actuators being connected incorrectly, and to thereby provide an automated-driving device that enables work efficiency to be improved.

BRIEF DESCRIPTION OF THE DRAWINGS

FIG. 4 is a view showing an example of interrelationships between types of general actuators and identifiers contained in identification information that is stored in a storage unit of the same embodiment.

BEST EMBODIMENTS FOR IMPLEMENTING THE INVENTION

Figure 1:
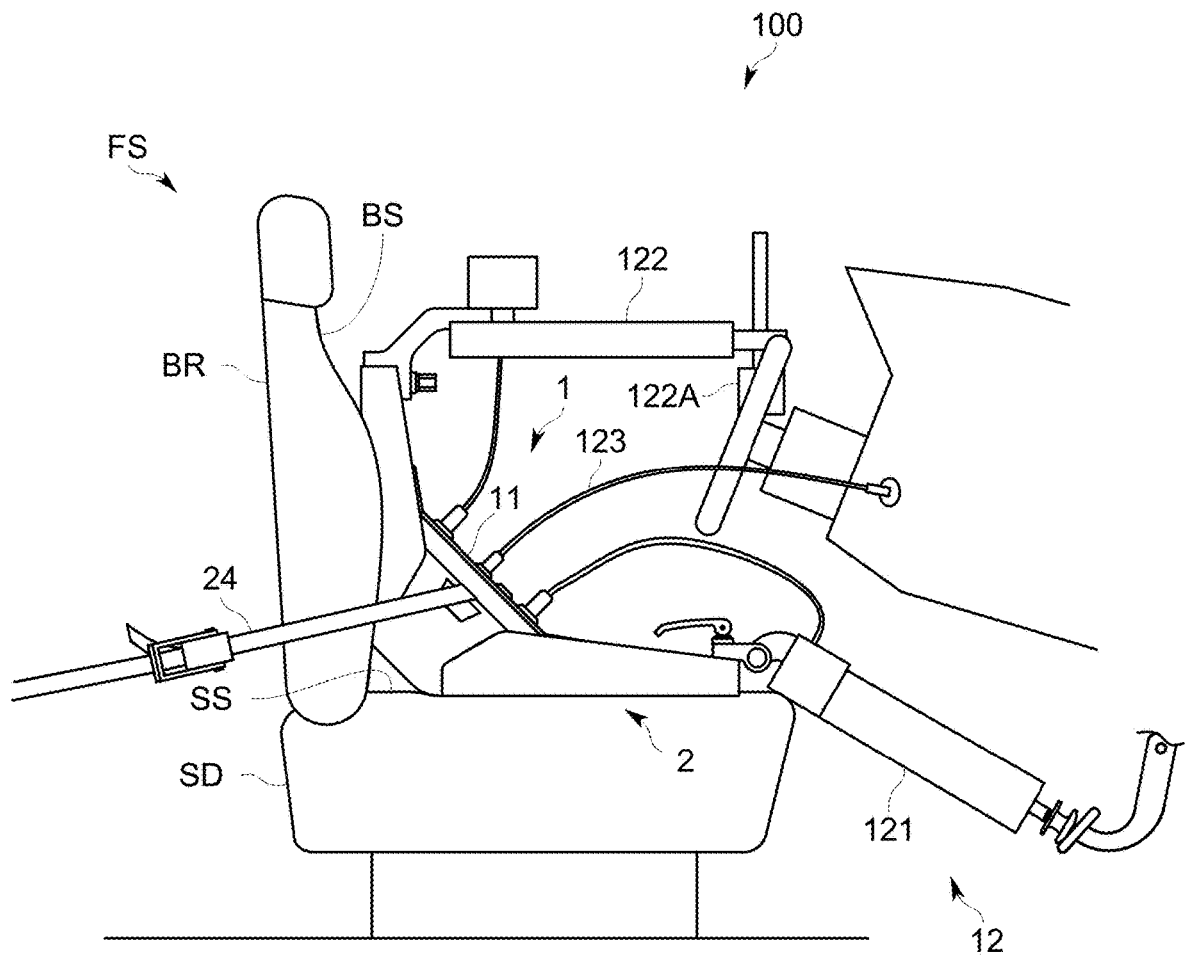
FIG. 1 is a plan view schematically showing the overall structure of a vehicle testing system of the present embodiment.

Hereinafter, an automated-driving unit 100 which is equipped with an automated-driving device 1 according to an embodiment of the present invention will be described with reference to the drawings. Note that, in the following description, a complete vehicle is described as a specific aspect of a test body.

The automated-driving unit (car-driving unit) 100 of the present embodiment is employed, for example, in vehicle performance tests that use a chassis dynamometer. The automated-driving unit 100 is installed inside a vehicle and causes that vehicle to perform automated-driving. As is shown more specifically in FIG. 1 and FIG. 2, the automated-driving unit 100 is provided with the automated-driving devices (car-driving device) 1 which is placed on a seat FS (more specifically, a driver's seat) and causes the vehicle to perform automated-driving, and a holding device 2 that holds the automated-driving device 1 on the driver's seat FS. Note that, in the following description, when the automated-driving unit 100 has been placed in the correct position on the driver's seat FS (i.e., in a position which is suitable for performing a performance test), the front-rear, left-right, and up-down directions are described taking the front-rear direction of the test body as a reference.

The automated-driving device 1 causes the vehicle to perform automated-driving by performing various operations such as depressing and releasing an accelerator pedal, a brake pedal, and a clutch pedal, switching positions of a shift lever, and turning various types of switches that are mounted in the vehicle on and off from its position on the driver's seat FS. More specifically, the automated-driving device 1 is provided with a plurality of types of actuators 12 that perform various types of operations, and a control device 11 that controls movements of the actuators 12.

The actuators 12 receive control signals from the control device 11 and perform various operations. More specifically, the actuators 2 are electrically connected via a cable to the control device 11, and receive control signals from the control device 11. The actuators 12 operate based on these signals.

The automated-driving device 1 of the present embodiment is provided with actuators 12 in the form of a plurality (three in this case) of pedal actuators 121 that are used to perform pedal (i.e., accelerator, brake, and clutch) operations, and a shift actuator 122 that is used to perform a position-shifting operation of a shift (either a floor shift or a column shift) lever. Here, the shift actuator 122 is formed such that a hand portion 122A which is in contact with the shift lever is able to move in a front-rear direction (i.e., along an X axis), a left-right direction (i.e., along a Y axis), and an up-down direction (i.e., along a Z axis).

Figure 3:
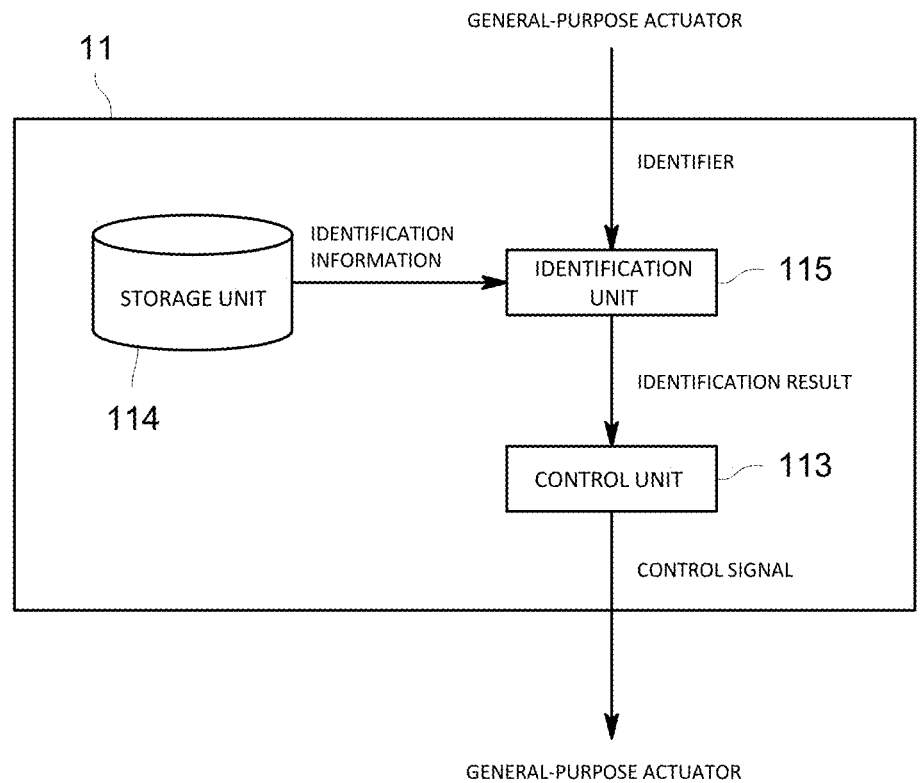
FIG. 3 is a function block diagram of a control device of the same embodiment.

The control device 11 is what is commonly known as a computer which has analog electrical circuits having buffers and amplifiers, a CPU, digital electrical circuits such as memory and a DSP and the like, and an A/D converter or the like that is connected between these various portions. As a result of the CPU and the peripheral devices thereof operating in mutual collaboration in accordance with a predetermined program stored in the memory, as is shown in FIG. 3, the control device 11 functions as a control unit 113 that controls movements of at least the respective actuators 12.

In accordance with the types of actuators 12 that are connected, the control unit 113 transmits control signals that properly correspond thereto individually to each actuator 12.

Structurally, the control device 11 is formed having a box-shaped external appearance. The control device 11 is placed in a predetermined position on the holding device 2 such that a bottom surface and a rear surface thereof are firmly held. As a result, the control device 11 remains held in the correct placement position on the holding device 2.

The automated-driving device 1 is provided with a plurality of connectors 13 to which cables of the actuators 12 are electrically connected that are located on a front surface 111 of the control device 11 which faces towards the front of the vehicle when held on the holding device 2. The automated-driving device 1 is provided with connectors 13 in the form of pedal actuator connectors 131 to which the pedal actuators 121 are connected, and shift actuator connectors 132 to which the shift actuator 122 is connected. In the present embodiment, all of these multiple types of connectors 13 are provided on the front surface 111 of the control device 11.

Three pedal actuator connectors 131 are provided so as to correspond individually to the three types of pedal actuators 121. In addition, three types of shift actuator connectors 132 are provided so as to correspond individually to the X axis, the Y axis and the Z axis of the shift actuator 122.

The holding device 2 is placed on and fixed to the driver's seat FS of the vehicle, and the automated-driving device 1 is mounted on the holding device 2 and held in position thereby.

Figure 2:
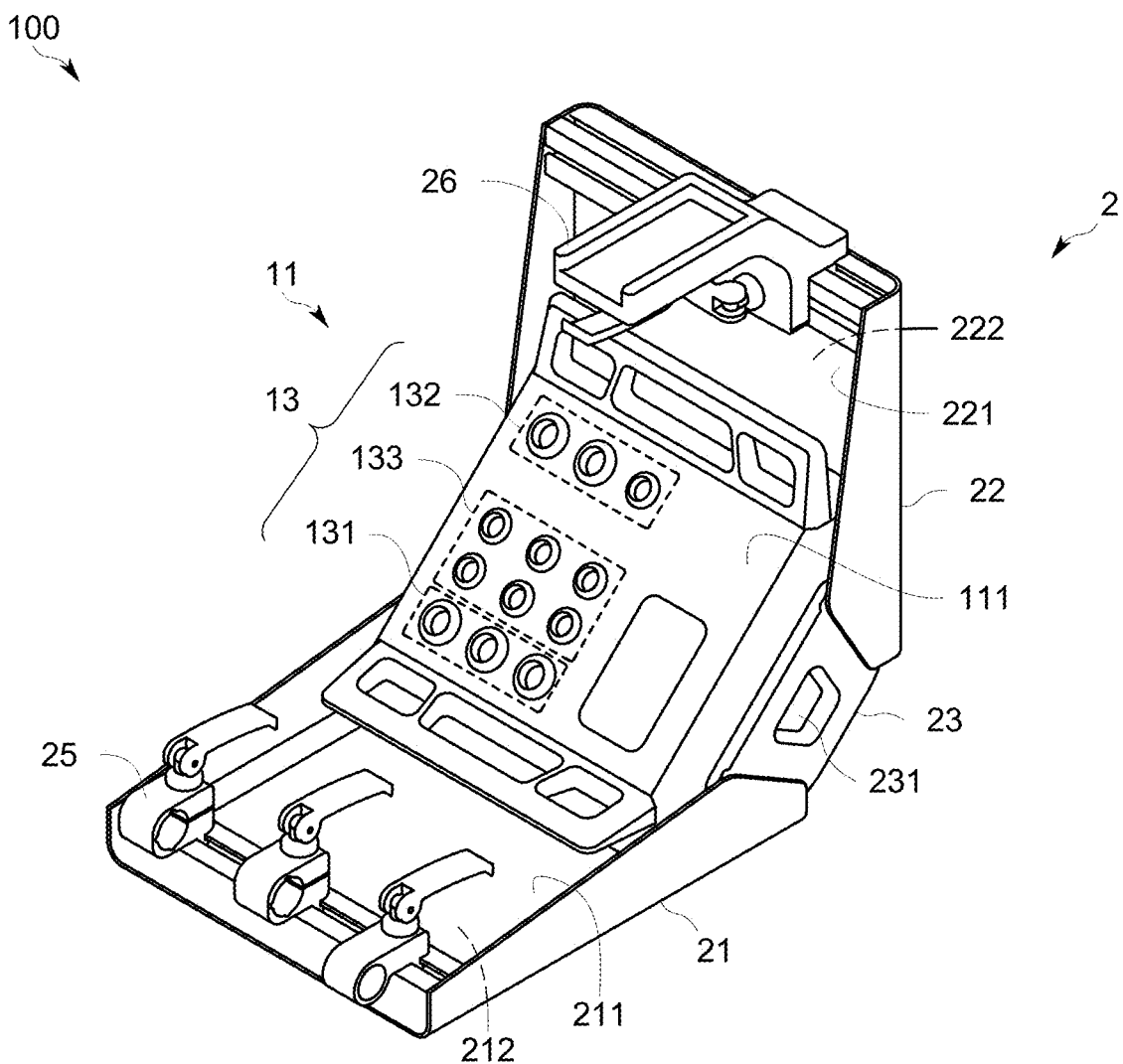
FIG. 2 is a perspective view schematically showing the structure of an automated-driving device of the same embodiment.

As is shown in FIG. 1 and FIG. 2, the holding device 2 is placed on a seat portion SD of the driver's seat FS, and is provided with a mounting portion 21 on which the automated-driving device 1 is mounted, a back portion 22 that is placed against a backrest BR of the driver's seat FS, and a joining portion 23 that joins the mounting portion 21 and the back portion 22 together. The mounting portion 21, the back portion 22, and the joining portion 23 are each formed schematically in a plate shape. The mounting portion 21 and the back portion 22 are joined together via the joining portion 23 substantially in an L shape so as to be in contact respectively with the seat portion SD and the backrest BR of the driver's seat FS.

The mounting portion 21 has a mounting surface 211 on which the automated-driving device 1 is mounted, and a bottom surface 212 that is formed on a rear side from the mounting surface 211 and that is in contact with a seat surface SS of the seat portion SD. Here, the bottom surface 212 is formed as a planar surface, and is shaped so as to enable it to be in surface contact with the seat surface SS. The mounting surface 211 is formed so as to hold a bottom surface of the automated-driving device 1 in position when this is mounted thereon. The pedal actuators 121 are attached to the vicinity of a front end of the mounting portion 21, and a plurality of pedal actuator fixing portions 25 are provided in order to fix the pedal actuators 121 in position.

The back portion 22 has a front surface 221 that faces towards the front side of the vehicle when mounted on the seat FS, and a back surface 222 that is formed on a rear side of the front surface 221 and is in contact with a backrest surface BS of the backrest BR. Here, the back surface 222 is formed as a planar surface and is shaped so as to enable it to be in surface contact with the backrest surface B S. The front surface 221 is formed so as to hold a back surface of the automated-driving device 1 in position when this is mounted thereon.

A connecting portion 231 to which a fixing mechanism 24 (specifically, a belt) that is used to fix the holding device 2 on the driver's seat FS is connected is provided on the joining portion 23. By applying tension to the belt forming the fixing mechanism 24 that is connected to the connecting portion 231 by pulling the belt diagonally downwards and towards the rear of the driver's seat FS, the holding device 2 is held in position on the driver's seat FS.

Moreover, the automated-driving device 1 of the present embodiment is also provided with a plurality of types of general-purpose actuators 123 that are furnished with predetermined functions in order to operate various switches of the vehicle, and with a plurality of general-purpose actuator connectors 133 to which the plurality of types of general-purpose actuators 123 are connected. When one of this plurality of general-purpose actuator connectors 133 is connected to a general-purpose actuator 123, the control device 11 automatically identifies the type of general-purpose actuator 123 that has been connected.

In the present embodiment, an individual identifier (here, a number from 1 to 9) that corresponds respectively to each of the plurality of types of general-purpose actuator 123 is attached to each type of general-purpose actuator 123 so that the type of general-purpose actuator 123 that is connected can be automatically identified. Furthermore, as is shown in FIG. 3, the control device 11 is also furnished with functions of a storage unit 114 and an identification unit 115.

The storage unit 114 is set in a predetermined area of the memory, and stores identification information that associates each identifier with the type of general-purpose actuator 123.

The storage unit 114 stores identification information that identifies the type of general-purpose actuator 123 for at least one of starter operations, button-type shift operations, paddle-type shift operations, and air-conditioner operations. As is illustrated in FIG. 4, in the present embodiment, the storage unit 114 stores identification information that identifies the type of general-purpose actuator 123 for operations such as, for example, push starter operations, turn starter operations, button shift (P switch) operations, button shift (N switch) operations, button shift (D switch) operations, button shift (shift up) operations, paddle shift (shift down) operations, air-conditioner (turn on) operations, and air-conditioner (turn off) operations. Not limited to the example illustrated in FIG. 4, the storage unit 114 may further store identification information that identifies the type of general-purpose actuator 123 for operations such as, for example, button shift (R switch) operations, button shift (shift down) operations, paddle shift (shift up) operations, and traction control on/off switch operations. Note that the present invention is not limited to this and the identification information stored by the storage unit 114 may identify a single type of general-purpose actuator 123, or multiple types of general-purpose actuators 123.

The identification unit 115 identifies the type of general-purpose actuator 123 that is connected to a general-purpose actuator connector 133. More specifically, the identification unit 115 reads the identifier for the general-purpose actuator 123 that is connected to the general-purpose actuator connector 133, and identifies the type of general-purpose actuator 123 that is connected by referring to the identifier which it has read and to the identification information stored in the storage unit 114. An identification result showing the type of general-purpose actuator 123 that has been identified is then transmitted to the control unit 113.

Here, the control device 11 is provided with individual drivers that are used to operate each type of general-purpose actuator 123. Each general-purpose actuator 123 that is connected is operated by the particular driver that corresponds to that type of general-purpose actuator 123 which has been identified by the identification unit 115.

The plurality (specifically, three rows×two levels=six) of general-purpose actuator connectors 133 provided in the automated-driving device 1 of the present embodiment all have the same connecting structure (in other words, all have the same shape). Moreover, the plurality of types of general-purpose actuators 123 all have connecting terminals having the same connecting structure so that they can be connected to any one of the plurality of general-purpose actuator connectors 133.

Here, the plurality of general-purpose actuator connectors 133 may be concentrated in the front surface 111 of the control device 11. In other words, here, all of the connectors 13 to which the various types of actuators are connected including the pedal actuator connectors 131, the shift actuator connectors 132 and the general-purpose actuators 123 are provided in the front surface 111 of the control device 11. Moreover, the front surface 111 of the control device 11 is inclined so as to face forwards and diagonally upwards when the control device 11 is being held in the holding device 2 and is installed on the driver's seat FS.

Moreover, in the present embodiment, as is shown in FIG. 2, it is also possible for the shift actuator 122 provided in the automated-driving device 1 to be disposed in the back portion 22 of the holding device 2. More specifically, the shift actuator 122 is attached to an upper end portion (i.e., above an upper end portion of the control device 11) of the back portion 22 of the holding device 2, and a shift actuator fixing portion 26 is provided in order to fix the shift actuator 122 in place. The shift actuator 122 is formed such that when it is attached to the shift actuator fixing portion 26, the hand portion 122A is able to move along the X axis, the Y axis, and the Z axis. Because it is necessary to attach the shift actuator 122 high enough to enable it to operate a shift lever beside the steering wheel, if the shift lever is attached to the control device 11, then it is necessary to attach a separate supporting component to the control device 11 to support the shift actuator 122. Consequently, the weight of the overall automated-driving device 1 increases. However, by attaching the shift actuator 122 to the back portion 22 of the holding device 2 which is already provided, there is no need to attach a separate supporting component to the control device 11, and this is able to contribute to a reduction in the weight of the overall device.

According to the automated-driving unit 100 of the present embodiment which has the above-described structure, when a general-purpose actuator 123 is connected to any one of the plurality of general-purpose actuator connectors 133, because the control device 11 automatically identifies the type of general-purpose actuator 123 that is connected, the general-purpose actuator 123 can be made to function irrespective of which general-purpose actuator connector 133 it is connected to. In other words, there is no need to match each general-purpose actuator 123 one-to-one with its corresponding general-purpose actuator connector 133, and any of a plurality of general-purpose actuator connectors 133 can be matched with any of a plurality of general-purpose actuators 123. Because of this, it is possible to prevent incorrect connections occurring as a result of a general-purpose actuator 123 being connected to a general-purpose actuator connector 133 which it does not match. Furthermore, because an operator is able to connect a general-purpose actuator 123 to any one of a plurality of general-purpose actuator connectors 133, the connection task is simple and work efficiency is improved. Furthermore, although the positions of the various switches operated by the general-purpose actuators 123 vary depending on the vehicle make and model, because the general-purpose actuators 123 function correctly irrespective of which of the plurality of general-purpose actuator connectors 133 they are connected to, a general-purpose actuator 123 can be connected to the general-purpose actuator connector 133 that is closest to the switch to be operated. As a result, cable routing can be made tidier, and work efficiency thereby improved.

Note that the present invention is not limited to the above-described embodiment.

In the above-described embodiment, an individual identifier is provided respectively for each one of a plurality of types of general-purpose actuators 123, and the identification unit 115 reads this identifier and thereby identifies the type of general-purpose actuator 123, however, the present invention is not limited to this. In another embodiment, it is also possible for a different connection point structure to be provided for the connecting terminal of each one of the plurality of types of general-purpose actuators 123, and for the type of general-purpose actuator 123 that is connected to the general-purpose actuator connector 133 to be identified by this connection point structure.

In the above-described embodiment, all of the connectors 13 are disposed on the front surface 111 of the control device 11, however, the present invention is not limited to this, and it is also possible for either a portion or all of the connectors 13 to be disposed in another location such as on a back surface or top surface of the control device 11. Moreover, the connectors 13 may instead be disposed on a separate control device that is connected to the control device 11.

In the above-described embodiment, the front surface 111 of the control device 11 is inclined so as to face forwards and diagonally upwards, however, the present invention is not limited to this. In another embodiment, it is also possible for the front surface 111 of the control device 11 to face perpendicularly towards the front.

In the above-described embodiment, it is also possible for either a portion of or all of the functions of the control unit 113, the storage unit 114, and the identification unit 115 to be allocated to a separate control device that is connected to the control device 11.

In the above-described embodiment, a complete vehicle is described as an example of a specific aspect of a test body, however, the present invention is not limited to this. In another embodiment, it is also possible for the test body to be a portion of a complete vehicle.

In the above-described embodiment, the automated-driving unit 100 is employed in a vehicle performance test that uses a chassis dynamometer, however, the present invention is not limited to this. The automated-driving unit 100 may also be employed in vehicle performance tests that use various types of drive system dynamometers in which a load is applied to a test body in the form of a complete vehicle or a portion thereof such as, for example, an engine dynamometer or a brake dynamometer or the like.

In the above-described embodiment, the automated-driving device 1 performs depressing and releasing operations for an accelerator pedal, a brake pedal, and a clutch pedal, and also position switching operations for a shift lever, however, the present invention is not limited to this. It is also possible for the automated-driving device 1 to be formed so that it performs a portion of these operations in accordance with the type of vehicle (for example, an AT vehicle or a MT vehicle) forming the test body.

It is also possible for the above-described automated-driving vehicle 1 to be formed such that by operating either one or a plurality of the actuators 12 that are connected to the control device 11 in a predetermined sequence, and by operating the vehicle pedals and various buttons and the like in a predetermined sequence, the state of the vehicle can be switched to a predetermined test mode. This test mode is a mode in which, for example, the vehicle's abnormality determination function is switched off, the collision avoidance function is switched off, and the speed limiter is also disengaged. The operation performed in order to switch a vehicle to test mode differs depending on the make and model of vehicle. In this case, it is possible for the control unit 113 to store one or a plurality of operating sequences for each actuator 12 in order to switch the vehicle to test mode. Accordingly, when the control unit 113 receives a predetermined input from an operator, the control unit 113 is able to perform sequence control for each actuator 12 and thereby switch the vehicle to test mode.

Furthermore, it should be understood that the present invention is not limited to the above-described embodiment, and that various modifications and the like may be made thereto insofar as they do not depart from the spirit or scope of the present invention.

DESCRIPTION OF THE REFERENCE NUMERALS

1 . . . Automated-Driving Device
11 . . . Control Device
111 . . . Front Surface 123 . . . General-Purpose Actuator
133 . . . General-Purpose Actuator Connector

What is claimed is:

1. An automated-driving device that causes a test body which is either a vehicle or part of a vehicle to perform automated-driving using a plurality of types of actuators, comprising:
    a plurality of connectors to which the actuators are connected, wherein each of the plurality of types of actuators has an identifier that corresponds to the type of actuator; and
    a control device that controls movements of the actuators that are connected to the connectors and comprises a storage unit that stores identification information that associates the identifier with the type of actuator and an identification unit that reads the identifier of the actuator connected to the connector and, by referring to the relevant identifier and the identification information, identifies the type of actuator that is connected, wherein; when each of the actuators is connected to one of the connectors, the control device identifies the type of actuator that is connected.

2. The automated-driving device according to claim 1, wherein each of the plurality of connectors has a same shape.

3. The automated-driving device according to claim 1, wherein the storage unit stores identification information for at least one of a starter operation, a button-type shift operation, a paddle-type shift operation, and an air-conditioner operation.

4. The automated-driving device according to claim 1, wherein when the automated-driving device has been installed on a driver's seat of the test body, the plurality of connectors are positioned at a front surface of the control device.

5. A vehicle testing system comprising:
    the automated-driving device according to claim 1;
    a dynamometer that applies a load to the test body that is being driven by the automated-driving device; and
    an exhaust gas analysis device that analyzes exhaust gas discharged from the test body.

6. An identification method for an automated-driving device that causes a test body which is either a vehicle or part of a vehicle to perform automated-driving using a plurality of types of actuators, wherein each of the plurality of types of actuators has an identifier that corresponds to the type of actuator and wherein the automated-driving device includes a plurality of connectors to which the actuators are connected, a storage unit that stores identification information which associates the identifier with the type of actuator, and an identification unit, the method comprising:
    reading via the identification unit the identifier of the actuator connected to the connector when the actuator is connected to any one of the plurality of connectors, and
    identifying via the identification unit the types of actuators that are connected by referring to the read identifier and the identification information.

* * * * *